United States Patent Office 3,509,172
Patented Apr. 28, 1970

3,509,172
α-1-p-CHLOROBENZOYL-2-METHYL-5-NITRO-
3-INDOLINYL ACETIC ACID
John Martin Chemerda, Watchung, and Meyer Sletzinger,
North Plainfield, N.J., assignors to Merck & Co., Inc.,
Rahway, N.J., a corporation of New Jersey
No Drawing. Filed July 26, 1967, Ser. No. 656,037
Int. Cl. C07d 27/38
U.S. Cl. 260—326.11          1 Claim

ABSTRACT OF THE DISCLOSURE

The invention relates to novel α-1-p-chlorobenzoyl-2-methyl-5-nitro-3-indolinyl acetic acids.

---

This invention relates to a new method of preparing certain alpha - (1-aroyl-3-indolyl)alkanoic acids and to new intermediates therefor. More particularly, it relates to a method of preparing 1-p-chlorobenzoyl-2-methyl-3-indolylacetic acids of the formula:

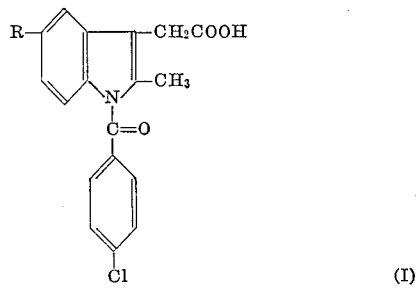

(I)

wherein R is methoxy or dimethylamino. These compounds are disclosed and claimed in U.S. Patent No. 3,161,654, issued Dec. 15, 1964, to Shen.

In the Shen patent, 1-p-chlorobenzoyl-2-methyl-3-indolylacetic acids are prepared by a series of reactions in which a 2-methyl-3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1 - acylate is converted to the free acetic acid derivative by a pyrolysis process. It is an object of this invention to provide an alternative route to these compounds. It is a further object to provide new intermediates for use in said alternative route. Other objects will be apparent hereinafter.

In accordance with the present invention, it has been discovered that compounds of Formula I can be prepared by the dehydrogenation of an indole derivative of the Formula II:

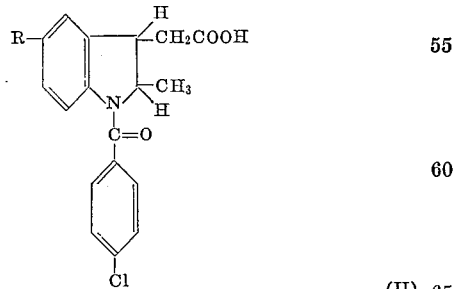

(II)

wherein R is as defined above.

The dehydrogenation of the compounds of Formula II can be effected most suitably by catalytic means. Among the useful dehydrogenation systems are palladium on charcoal, sulfur, selenium, chloranil or dichloro-dicyanobenzoquinone. Of the foregoing dehydrogenation reagents, the preferred catalyst is palladium on charcoal. The reaction is performed in a liquid medium which is a solvent for the starting material and is inert to dehydrogenation conditions. Among the suitable solvents are mesitylene, cyclohexene and dihydronaphthalene.

Dehydrogenation is best performed at elevated temperatures, i.e., temperatures up to and including reflux temperatures. After the dehydrogenation reaction has been completed, the dehydrogenation catalyst is separated off from the reaction mixture and the desired product of Formula I can be purified by conventional means.

The starting materials (i.e., the compounds of Formula II) for the process of the present invention are new compounds and form one aspect of the present invention. They can be prepared by a series of reactions in which a 2-methyl-3-indolylacetic acid (compound III) is reduced to a 2-methyl-3-indolinylacetic acid (compound IV); the indolinyl derivative is 1-p-chlorobenzoylated (compound V); the 1-p-chlorobenzoyl derivative is nitrated at the 5-position (compound VI); and the resultant nitro derivative is reduced to the corresponding 5-amino derivative (compound VII). Treatment of the hydrochloride of compound VII with nitrous acid and methanol yields the corresponding 5-methoxyindoline which is the indoline derivative of Formula II, wherein R is methoxy. Alternatively, treatment of compound VII with a methylating agent gives the derivative of Formula II wherein R is dimethylamino. This sequence of reactions is outlined in the following flow sheet.

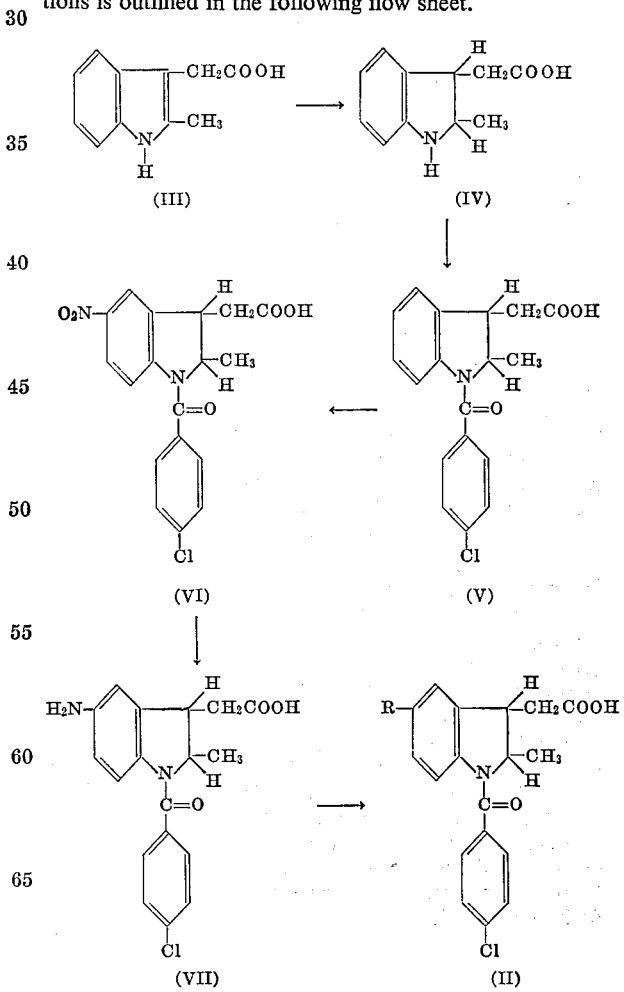

The following examples are presented to further illustrate the present invention.

EXAMPLE 1

Preparation of 2-methyl-3-indolinylacetic acid

To a solution of 0.1 equivalent of 2-methyl-3-indolylacetic acid in 200 ml. of methanol was added 5 g. of Raney nickel. The mixture was reduced at 50–60° C. and the hydrogenation stopped after 1 mole of hydrogen was absorbed. The methanol solution was filtered from the catalyst and concentrated in vacuo to give 2-methyl-3-indolinylacetic acid.

EXAMPLE 2

Preparation of 1-p-chlorobenzoyl-2-methyl-3-indolinylacetic acid

To a solution of 0.1 equivalent of 2-methyl-3-indolinylacetic acid in 150 ml. of pyridine was added slowly 0.1 equivalent of p-chlorobenzoyl chloride over a 30-minute period, keeping the temperature between 15 and 20° C. After all of the chloride was added, the reaction was stirred for an additional 2 hours at 25° C. and then concentrated in vacuo to a small volume. The residue was quenched with 250 ml. of water at 5° C. and after acidification to a pH of about 2.5 with 10% HCl, was extracted with ether. The ether layer was concentrated in vacuo, leaving 1-p-chlorobenzoyl-2-methyl-3-indolinylacetic acid in the residue.

EXAMPLE 3

Preparation of 1-p-chlorobenzoyl-2-methyl-5-nitro-3-indolinylacetic acid

To a mixture of 8.0 ml. of concentrated nitric acid in 25 ml. of concentrated sulfuric acid is added 10 g. of 1-p-chlorobenzoyl-2-methyl-3-indolinylacetic acid while maintaining the temperature of the reaction mixture between 10 and 20° C. by external cooling. The reaction mixture is held at 5–10° C. for 12 hours and then is poured slowly into 200 ml. of ice water with stirring. The precipitate is collected, washed thoroughly with water and recrystallized from ethanol, thus giving 1-p-chlorobenzoyl-2-methyl-5-nitro-3-indolinylacetic acid.

EXAMPLE 4

Preparation of 1-p-chlorobenzoyl-2-methyl-5-amino-3-indolinylacetic acid

A suspension of 11 g. of 1-p-chlorobenzoyl-2-methyl-5-nitro-3-indolinylacetic acid and 5.0 g. of 10% palladium on charcoal catalyst in 140 ml. of ethanol is hydrogenated at a pressure of 3 atmospheres at room temperature. After the hydrogen absorption is complete, the catalyst and the solvent are removed, and the solid residue is recrystallized from benzene to give 1-p-chlorobenzoyl-2-methyl-5-amino-3-indolinylacetic acid.

EXAMPLE 5

Preparation of 1-p-chlorobenzoyl-2-methyl-5-methoxy-3-indolinylacetic acid and methyl ester To a solution of 3.8 g. of 1-p-chlorobenzoyl-2-methyl-5-amino-3-indolinylacetic acid hydrochloride in 50 ml. of methanol was added 1.2 g. of methylnitrite. The solution was heated to 90–100° C. in a glass-lined autoclave for 1 hour. The system was removed in vacuo and the solid residue recrystallized from methanol as a mixture of the free acid of the methyl ester. Hydrolysis of the mixture in 100 ml. of aqueous methanol (1:1) at 45–50° C. for 2 hours, concentration of the reaction product in vacuo, extraction of the residue with ether and evaporation gave 1 - p - chlorobenzoyl - 2 - methyl - 5 - methoxy - 3 - indolinyacetic acid.

EXAMPLE 6

1 - p - chlorobenzoyl - 2 - methyl - 5 - amino - 3 - indolinylacetic acid (10.5 g.) is refluxed with methyl orthocarbonate (100 ml.) while slowly distilling methanol out of the mixture through a fractionating column. When 2 equivalents of methanol have distilled out, the reaction product is cooled and evaporated in vacuum, leaving the product, 1-p-chlorobenzoyl-2-methyl-5-dimethylamino-3-indolinylacetic acid. This product can be obtained in pure form by washing with water, drying over magnesium sulfate and then recrystallizing from t-butanol.

EXAMPLE 7

Preparation of 1-p-chlorobenzoyl-2-methyl-5-methoxy-3-indolylacetic acid

A mixture of 10 g. of 1-p-chlorobenzoyl-2-methyl-5-methoxy-3-indolinylacetic acid, 10 g. of 10% palladium-charcoal catalyst and 100 ml. of mesitylene was heated under reflux for 3 hours. Filtration to remove the catalyst, evaporation to remove the mesitylene and recrystallization of the residue from ethyl acetate-hexane gave 1-p-chlorobenzoyl-2-methyl-5-methoxy-3-indolylacetic acid.

Following the foregoing procedure except for the replacement of mesitylene by other solvents such as cyclohexene or dihydronaphthaline resulted in the same product. Similarly, the product of Example 7 is obtained when the palladium-charcoal catalyst is replaced by other catalysts such as colloidal platinum or nickel.

EXAMPLE 8

Preparation of 1-p-chlorobenzoyl-2-methyl - 5 - dimethylamino-3-indolylacetic acid A mixture of 10 g. of 1-p-chlorobenzoyl-2-methyl-5-dimethylamino-3-indolinylacetic acid, 10 g. of 10% palladium-charcoal catalyst and 100 ml. of mesitylene was heated under reflux for 3 hours. Filtration to remove the catalyst, evaporation to remove the mesitylene and recrystallization of the residue from ethyl acetate-hexane gave 1 - p - chlorobenzoyl - 2 - methyl - 5 - dimethylamino - 3 - indolylacetic acid.

What is claimed is:
1. The compound of the formula:

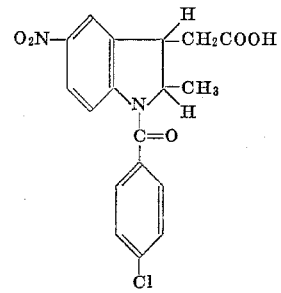

References Cited

FOREIGN PATENTS 6,408,030  1/1965  Netherlands.

ALTON D. ROLLINS, Primary Examiner

J. A. NARCAVAGE, Assistant Examiner

U.S. Cl. X.R.

260—326.13, 326.14